US008090109B2

(12) United States Patent
Tung et al.

(10) Patent No.: US 8,090,109 B2
(45) Date of Patent: Jan. 3, 2012

(54) APPARATUS FOR PROCESSING AUDIO SIGNAL AND METHOD THEREOF

(75) Inventors: Hsu-Jung Tung, Kaohsiung (TW); Tzuo-Bo Lin, Taipei (TW)

(73) Assignee: RealTek Semiconductor Corp., Hsinchu (TW)

( * ) Notice: Subject to any disclaimer, the term of this patent is extended or adjusted under 35 U.S.C. 154(b) by 1527 days.

(21) Appl. No.: 11/511,242

(22) Filed: Aug. 29, 2006

(65) Prior Publication Data

US 2007/0050063 A1 Mar. 1, 2007

(30) Foreign Application Priority Data

Aug. 30, 2005 (TW) ................................ 94129737 A

(51) Int. Cl.
*H04R 5/00* (2006.01)
*G06F 17/00* (2006.01)

(52) U.S. Cl. .................... 381/26; 700/94; 381/1; 381/2; 381/22; 381/23; 381/56; 381/77; 381/94.1; 381/94.4

(58) Field of Classification Search ................ 381/1, 22, 381/26, 56, 23, 2, 77, 94.1, 94.4; 700/94
See application file for complete search history.

(56) References Cited

U.S. PATENT DOCUMENTS

| | | | |
|---|---|---|---|
| 3,884,705 A | 5/1975 | Blair | |
| 4,889,773 A | 12/1989 | Campbell et al. | |
| 4,996,085 A | 2/1991 | Sievers | |
| 5,260,120 A | 11/1993 | Moyle et al. | |
| 5,336,303 A | 8/1994 | Cocks | |
| 5,532,025 A | 7/1996 | Silverman et al. | |
| 5,912,976 A * | 6/1999 | Klayman et al. | 381/18 |
| 6,008,462 A | 12/1999 | Solwedel | |
| 6,620,308 B2 | 9/2003 | Gilbert | |
| 6,718,309 B1 * | 4/2004 | Selly | 704/503 |
| 2004/0013815 A1 | 1/2004 | Gros | |
| 2004/0063407 A1 * | 4/2004 | Shibuya et al. | 455/91 |
| 2005/0017221 A1 | 1/2005 | Marten | |
| 2005/0161641 A1 | 7/2005 | Gros | |
| 2005/0186442 A1 | 8/2005 | Gros | |
| 2006/0011893 A1 | 1/2006 | Gros | |

FOREIGN PATENT DOCUMENTS

| | | |
|---|---|---|
| DE | 196 18 435 C1 | 5/1997 |
| DE | 197 48 764 A1 | 5/1999 |
| DE | 197 48 764 A4 | 5/1999 |
| DE | 199 51 133 A1 | 4/2001 |
| DE | 199 51 133 A3 | 4/2001 |
| DE | 100 22 075 A1 | 11/2001 |
| DE | 100 22 075 A2 | 11/2001 |
| DE | 100 58 018 A1 | 5/2002 |
| DE | 100 58 018 A3 | 5/2002 |

(Continued)

*Primary Examiner* — Vivian Chin
*Assistant Examiner* — Paul Kim
(74) *Attorney, Agent, or Firm* — Thomas, Kayden, Horstemeyer & Risley, LLP

(57) ABSTRACT

An apparatus for processing an audio signal and method thereof applied to an audio playback system are disclosed. The apparatus comprises a decoder, an error-correcting circuit and an audio correcting module. The method for processing audio signals in accordance with the present invention decodes the audio signal to generate a decoded signal by the decoder. Then, the error-correcting circuit performs an error-correcting algorithm in the decoded signal to generate an error indication signal and an output audio signal. And the audio correcting module corrects the output audio signal to generate a corrected audio signal when the error indication signal indicates that the output audio signal has error.

18 Claims, 4 Drawing Sheets

FOREIGN PATENT DOCUMENTS

| | | | |
|---|---|---|---|
| DE | 100 58 118 | A | 5/2002 |
| EP | 0 545 605 | A2 | 6/1993 |
| TW | 396713 | | 7/2000 |
| TW | 408304 | | 10/2000 |
| TW | 518557 | | 1/2003 |
| WO | WO 02/42352 | A2 | 5/2002 |

* cited by examiner

APPARATUS FOR PROCESSING AUDIO SIGNAL AND METHOD THEREOF

BACKGROUND OF THE INVENTION

The present invention relates to an audio signal processing device, especially to audio signal correcting of the audio signal processing device.

By the popularity of digital multimedia devices, people have higher requirements of the resolution, quality of images and audio effect. Thus the data amount of multimedia devices is increasing dramatically that causes low transmission speed, transmission errors or loss of the transmission interfaces. This leads to difference between the signal of the transmission end and the signal of the receiving end. Therefore, the distortion of sound or image data happens on the receiving end. Moreover, there may be noise or blurred image that has a significant influence on the quality of playing.

New interfaces such as Digital Visual Interface (DVI) and High Definition Multimedia Interface (HDMI) have been developed to transmit high-resolution video signals and high-quality audio signals. However, the transmission interfaces available now still can't avoid problems of transmission errors or signal loss of audio signals. Thus there is degradation of sound quality.

SUMMARY OF THE INVENTION

Therefore it is an object of the present invention to provide an apparatus for processing audio signal and method thereof for improving sound quality.

It is another object of the present invention to provide an apparatus for processing audio signal and method thereof for preventing degradation of sound quality.

In order to achieve above objects, an apparatus for processing audio signal and method thereof in accordance with embodiments of the present invention applied to an audio playback system are provided. The apparatus includes a decoder and a correcting module. When the audio signal is transmitted to the audio playback system, the decoder decodes the audio signal so as to generate a decoded signal. An error-correcting circuit of the correcting module receives the decoded signal and performs an error-correcting algorithm in the decoded signal and then generates an error indication signal and an output audio signal. An audio correcting module of the correcting module receives the output audio signal and corrects the output audio signal to generate a corrected audio signal when the error indication signal indicates that the output audio signal has error.

The audio correcting module of the correcting module in accordance with embodiments of the present invention further has an audio correcting unit and a selector. The audio correcting unit receives the output audio signal from the error-correcting circuit and corrects the output audio signal to generate the corrected audio signal. Then the corrected audio signal is sent to the selector. After receiving the output audio signal from the error-correcting circuit and the corrected audio signal from the audio correcting unit, the selector chooses to output the corrected audio signal or the output audio signal to an audio play device according to the error indication signal.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
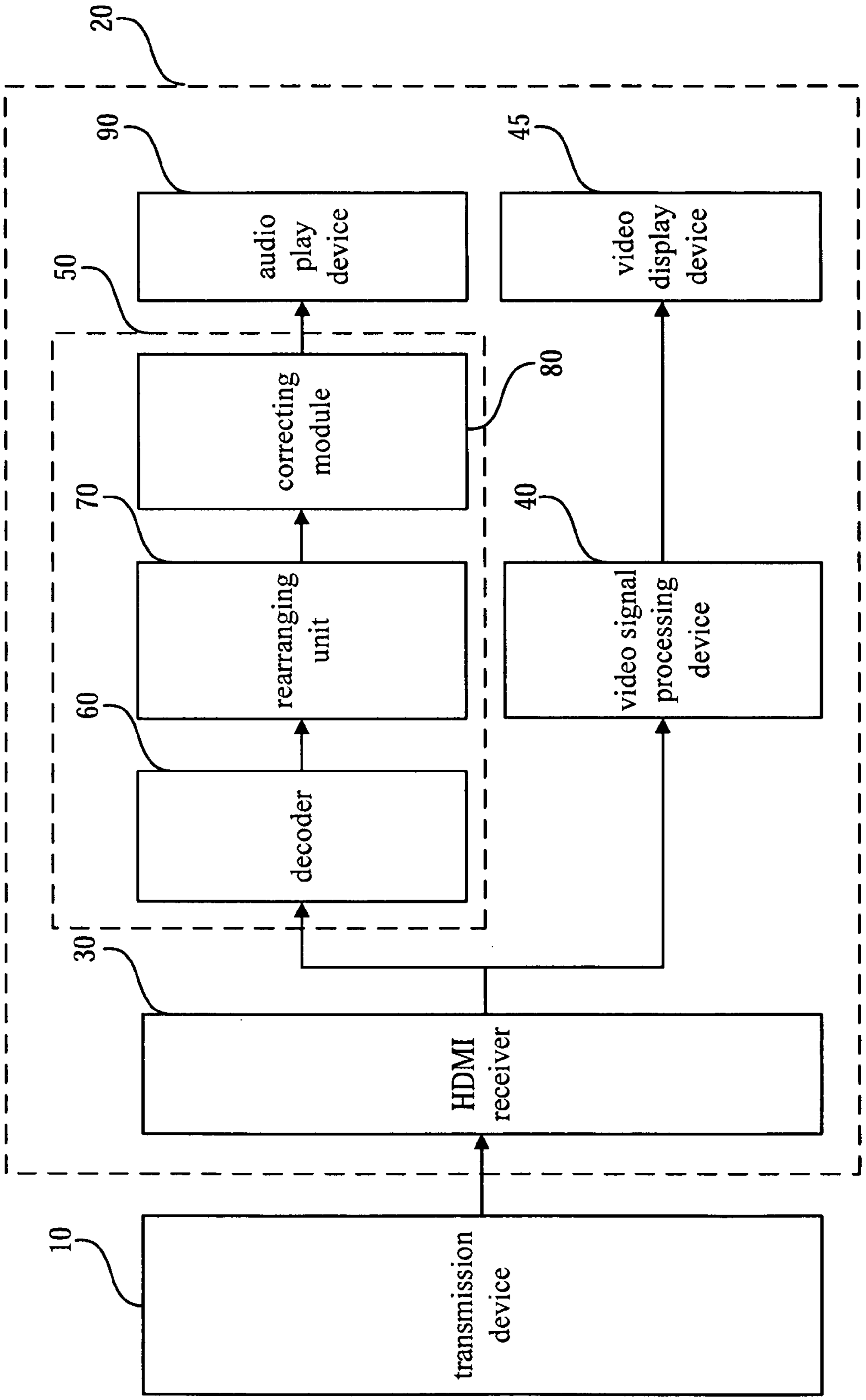
FIG. 1 is a block diagram of an embodiment of a video-audio display system in accordance with the present invention.

Reference is made to FIG. 1, in this embodiment, a video/audio playback system with HDMI interface is taken as an example, but the present invention is not limited to playback systems with HDMI interface. As shown in FIG. 1, a transmission device 10 sends video/audio signals to a video/audio playback system 20 by the HDMI interface for playing images and sound. In an embodiment, the video/audio signals are Transition Minimized Differential Signaling (TMDS). In an embodiment, the transmission device 10 is an optical disk player, while the video/audio playback system 20 is a digital television.

The video/audio playback system 20 includes a HDMI receiver 30, a video signal processing device 40, a video display device 45, an audio signal processing device 50, and an audio play device 90, In an embodiment, the audio signal processing device 50 includes a decoder 60, a rearranging unit 70, and an correcting module 80. The audio signal processing device 50 is an apparatus for processing the audio signal. The HDMI receiver 30 receives video/audio signals from the transmission device 10 and outputs an input video signal as well as an input audio signal. The input video signal is sent to the video signal processing device 40 for being processed and generating an output video signal that is transmitted to the video display device 45 for showing video images. In an embodiment, the video display device 45 can be a digital display device.

The input audio signal is transmitted to the decoder 60 for being decoded and the decoded signal is sent to the rearranging unit 70 for rearranging. Then the signal is transmitted to the correcting module 80 that corrects the decoded signals so as to prevent crackle and clicks that are caused by erroneous input audio signal and played by the audio play device 90. Thus the sound quality won't be reduced. In an embodiment, the audio play device 90 can be a speaker.

Figure 2:
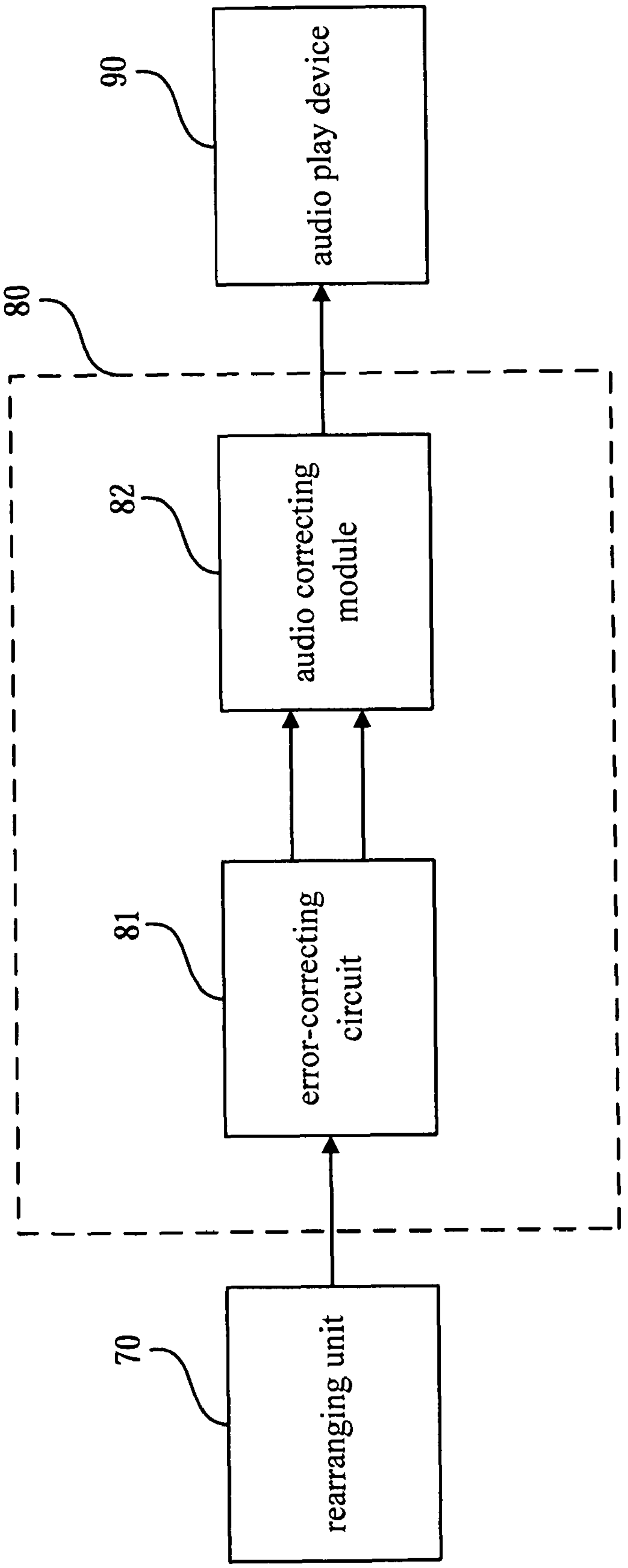
FIG. 2 is a block diagram of an embodiment of the correcting module in accordance with the present invention.

Refer to FIG. 2, the correcting module 80 includes an error-correcting circuit 81 and an audio correcting module 82. After receiving the decoded signal reconstructed by the rearranging unit 70, the error-correcting circuit 81 performs an error-correcting algorithm in the decoded signal to detect whether the decoded signal has errors. In the embodiment, according to the result of error detection, the error-correcting circuit 81 generates an error indication signal and a corresponding output audio signal that is sent to the audio correcting module 82. Taking the video/audio playback systems with HDMI interfaces as examples, the error-correcting circuit 81 is a BCH (Bose-Chaudhuri-Hocquenghem) circuit.

In this embodiment, when the BCH circuit detects 1-bit error, it can repair the error automatically and outputs the output audio signal while the error indication signal shows that the decoded signal is a signal originally with 1-bite error and already repaired into the output audio signal. When the decoded signal has multiple-bit errors, the BCH circuit cannot repair the multiple-bit errors and the decoded signal with the multiple-bit errors is output directly as the output audio signal. Correspondingly, the error indication signal shows the output signal having multiple-bit errors that means the output audio signal is wrong. When the decoded signal has no errors, the BCH circuit outputs the decoded signal directly as the output audio signal and the error indication signal shows that the output signal has no errors.

The audio correcting module 82 is used for correcting the erroneous encoded signal so as to generate a corrected audio signal played by the audio play device 90. In one of the embodiments of the audio correcting module 82, according to the error indication signal, the audio correcting module 82 knows whether the output audio signal has errors. If the output audio signal has errors, the correction is executed. There are a lot of ways to execute correction. For example, calculate average of at least one output audio signal prior or after the wrong output audio signal so as to generate the corrected audio signal. In another embodiment, prior to the wrong output audio signal, can be repeated as the corrected audio signal.

Figure 3:
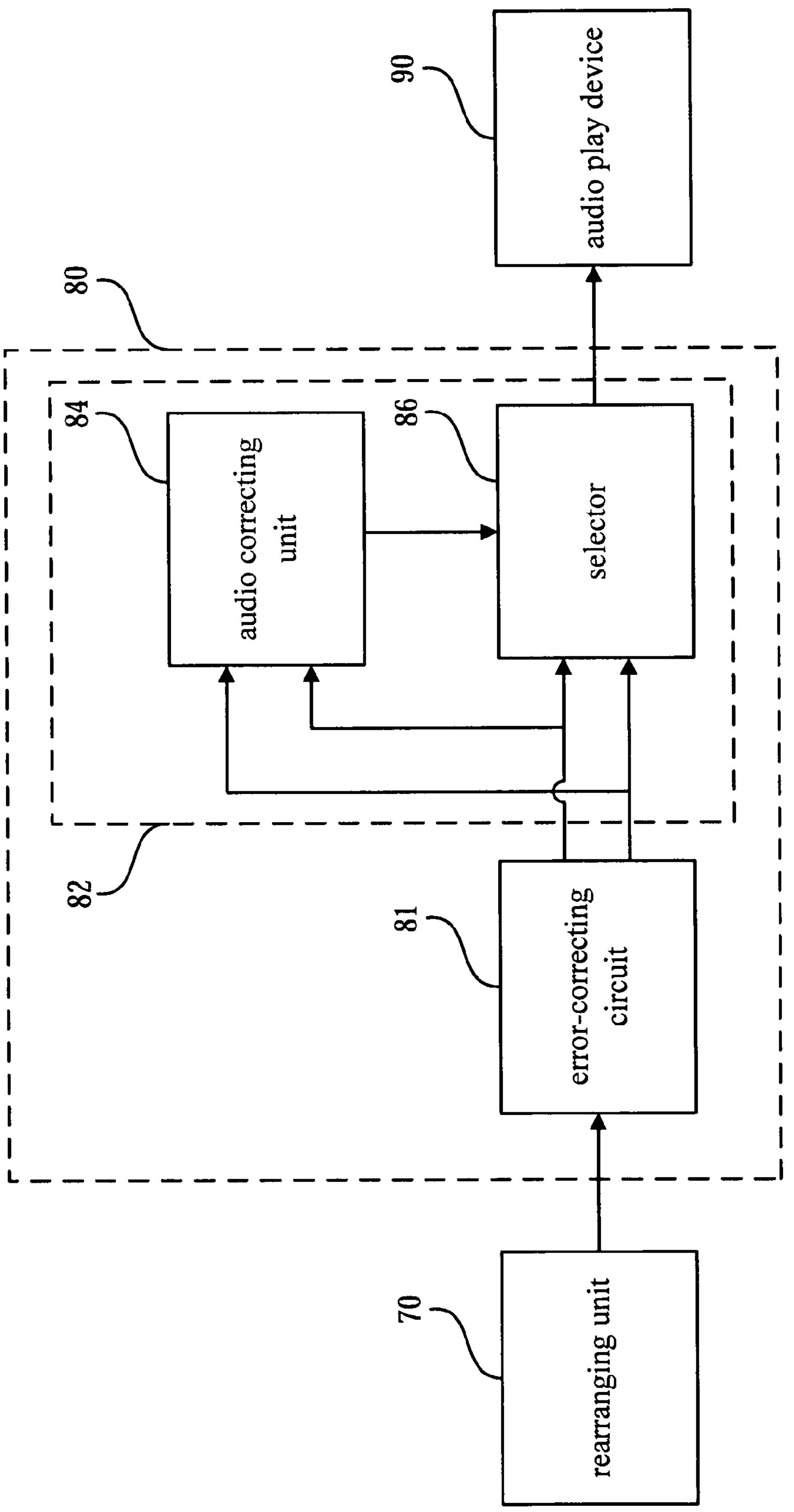
FIG. 3 is a block diagram of an embodiment of the audio correcting module in accordance with the present invention.

Refer to FIG. 3, the audio correcting module 82 includes an audio correcting unit 84 and a selector 86. According to the error indication signal, the audio correcting unit 84 knows that whether the output audio signal has errors. If there is an error, the correction process as mentioned in above embodiment is executed for generated a corrected audio signal. Moreover, filtering such as low pass filtering can be applied to the audio correcting unit 84. The audio correcting unit 84 can be a low pass filter that receives output audio signals prior or after the wrong output audio signal and performs low pass filtering operation (or interpolation techniques) so as to generate the corrected audio signal. The audio correcting unit 84 also can be an average circuit for averaging the output audio signals to generate the corrected audio signal. According to the error indication signal, the selector 86 selectively outputs one of the output audio signal without errors or the corrected audio signal into the audio play device 90 for playing sound. The selector 86 can be a multiplexer.

Figure 4:
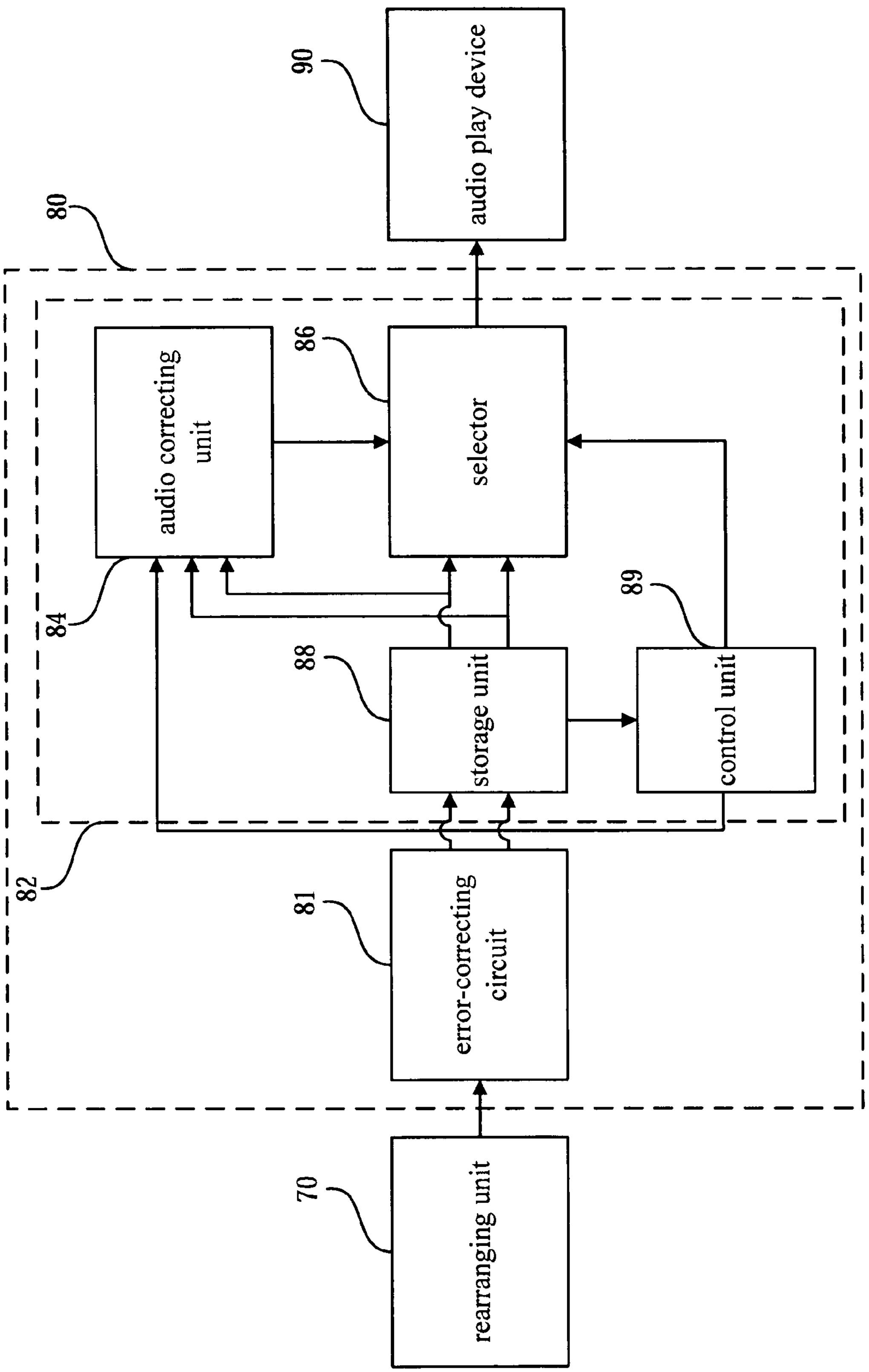
FIG. 4 is a block diagram of another embodiment of the audio correcting module in accordance with the present invention.

Refer to FIG. 4, the audio correcting module 82 further includes a storage unit 88 that temporarily stores the error indication signal and the output audio signals to make the audio correcting unit 84 repeatedly output the stored audio signal without error as the corrected audio signal or average the stored output audio signals without error to generate the corrected audio signal when the error indication signal indicates that the output audio signal has error. Mover, storage unit 88 temporarily stores the error indication signal and the output audio signal to make the audio correcting unit 84 do some more complicated operation such as Digital Signal Processing, DSP to meet users' requirements. The storage unit 88 can be various types of memory. In addition, in a further embodiment, the audio correcting module 82 further includes a control unit 89 that controls operation of circuits (ex: the selector 86 or the audio correcting unit 84 or both) according to the users' various requirements.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An apparatus for processing an audio signal comprising:
a decoder receiving and decoding the audio signal to output a decoded signal;
a correcting module coupled to the decoder, the correcting module comprising:
an error-correcting circuit receiving the decoded signal and performing an error-correcting algorithm in the decoded signal to generate an error indication signal and an output audio signal; and
an audio correcting module coupled to the error-correcting circuit for correcting the output audio signal to generate a corrected audio signal according to the output audio signal when the error indication signal indicates that the output audio signal has error.

2. The apparatus of claim 1, further comprising:
a rearranging unit coupled between the decoder and the correcting module for reconstructing the decoded signal.

3. The apparatus of claim 1 applied to an audio playback system.

4. The apparatus of claim 1, further comprising:
a High Definition Multimedia Interface (HDMI) receiver coupled to the decoder for receiving the audio signal via a HDMI interface.

5. The apparatus of claim 1, wherein the error-correcting circuit is a Bose-Chaudhuri-Hocquenghem (BCH) circuit.

6. The apparatus of claim 1, wherein the audio correcting module comprising:
a low-pass filter for low-pass filtering the output audio signal to generate the corrected audio signal.

7. The apparatus of claim 1, wherein the audio correcting module repeatedly outputs a previous data of the output audio signal as the corrected audio signal when the error indication signal indicates that the output audio signal has error.

8. The apparatus of claim 1, wherein the audio correcting module comprising:
an audio correcting unit receiving the output audio signal and correcting the output audio signal to generate the corrected audio signal; and
a selector receiving the output audio signal and the corrected audio signal, and selectively outputting one of the output audio signal and the corrected audio signal.

9. The apparatus of claim 8, wherein the audio correcting unit is a low pass filter for low-pass filtering the output audio signal to generate the corrected audio signal.

10. The apparatus of claim 1, wherein the audio correcting module comprising:
an average circuit for averaging the output audio signals to generate the corrected audio signal.

11. A method for processing an audio signal, comprising:
decoding the audio signal to output a decoded signal;
performing an error-correcting algorithm on the decoded signal to generate an error indication signal and an output audio signal; and
correcting the output audio signal to generate a corrected audio signal according to the output audio signal when the error indication signal indicates that the output audio signal has error.

12. The method of claim 11, wherein the decoding step comprising:
reconstructing the decoded signal.

13. The method of claim 11, wherein the error-correcting algorithm is a Bose-Chaudhuri-Hocquenghem (BCH) algorithm.

14. The method of claim 11, wherein the correcting step comprising:

low-pass filtering the output audio signal to generate the corrected audio signal.

15. The method of claim 14, further comprising:

selectively outputting one of the output audio signal and the corrected audio signal.

16. The method of claim 11, wherein the correcting step comprising:

temporarily storing the output audio signal; and repeatedly outputting the stored output audio signal as the corrected audio signal.

17. The method as claimed in claim 11, wherein the correcting step comprising:

temporarily storing the output audio signals; and averaging the stored output audio signals to generate the corrected audio signal.

18. The method of claim 11, further comprising:

selectively outputting one of the output audio signal and the corrected audio signal.

* * * * *